United States Patent
Narukawa

(10) Patent No.: US 8,828,345 B2
(45) Date of Patent: Sep. 9, 2014

(54) METHOD FOR MANUFACTURING TRICHLOROSILANE

(75) Inventor: Mitsutoshi Narukawa, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 260 days.

(21) Appl. No.: 13/533,035

(22) Filed: Jun. 26, 2012

(65) Prior Publication Data

US 2013/0004404 A1 Jan. 3, 2013

(30) Foreign Application Priority Data

Jun. 28, 2011 (JP) ................. 2011-143123

(51) Int. Cl.
| | | |
|---|---|---|
| C01B 33/00 | (2006.01) | |
| C01B 33/08 | (2006.01) | |
| C01B 33/04 | (2006.01) | |
| C01B 33/02 | (2006.01) | |

(52) U.S. Cl.
USPC ........... 423/342; 423/324; 423/341; 423/347; 423/349

(58) Field of Classification Search
USPC .................... 423/324, 341, 342, 347, 349
See application file for complete search history.

(56) References Cited

U.S. PATENT DOCUMENTS

| | | | | |
|---|---|---|---|---|
| 4,676,967 | A | * | 6/1987 | Breneman ................. 423/347 |
| 6,852,301 | B2 | * | 2/2005 | Block et al. ............... 423/347 |

FOREIGN PATENT DOCUMENTS

| | | |
|---|---|---|
| JP | 10-029813 A | 2/1998 |
| JP | 2006-001804 A | 1/2006 |
| WO | WO-02/38497 A1 | 5/2002 |
| WO | WO-2010/017231 A1 | 2/2010 |

OTHER PUBLICATIONS

European Search Report dated Nov. 2, 2012, issued for the corresponding European Patent Application No. 12173516.1.

* cited by examiner

*Primary Examiner* — James McDonough
(74) *Attorney, Agent, or Firm* — Edwards Wildman Palmer LLP

(57) ABSTRACT

This method for manufacturing trichlorosilane, includes: reacting metallurgical grade silicon with silicon tetrachloride and hydrogen so as to obtain a reaction gas; condensing the reaction gas so as to obtain a condensate; and distilling the condensate using a distillation system including a first distillation column and a secondary distillation column so as to refine trichlorosilane. While maintaining the condensate in a high temperature state so that a concentration of aluminum chloride in the condensate becomes in a range of a saturation solubility or less, the condensate flows to the first distillation column. A liquid distilled in the first distillation column is distilled by the secondary distillation column so as to refine trichlorosilane. A liquid in which aluminum chloride is concentrated is extracted from a bottom portion of the first distillation column. The extracted liquid is concentrated and dried, and then aluminum chloride is exhausted.

4 Claims, 1 Drawing Sheet

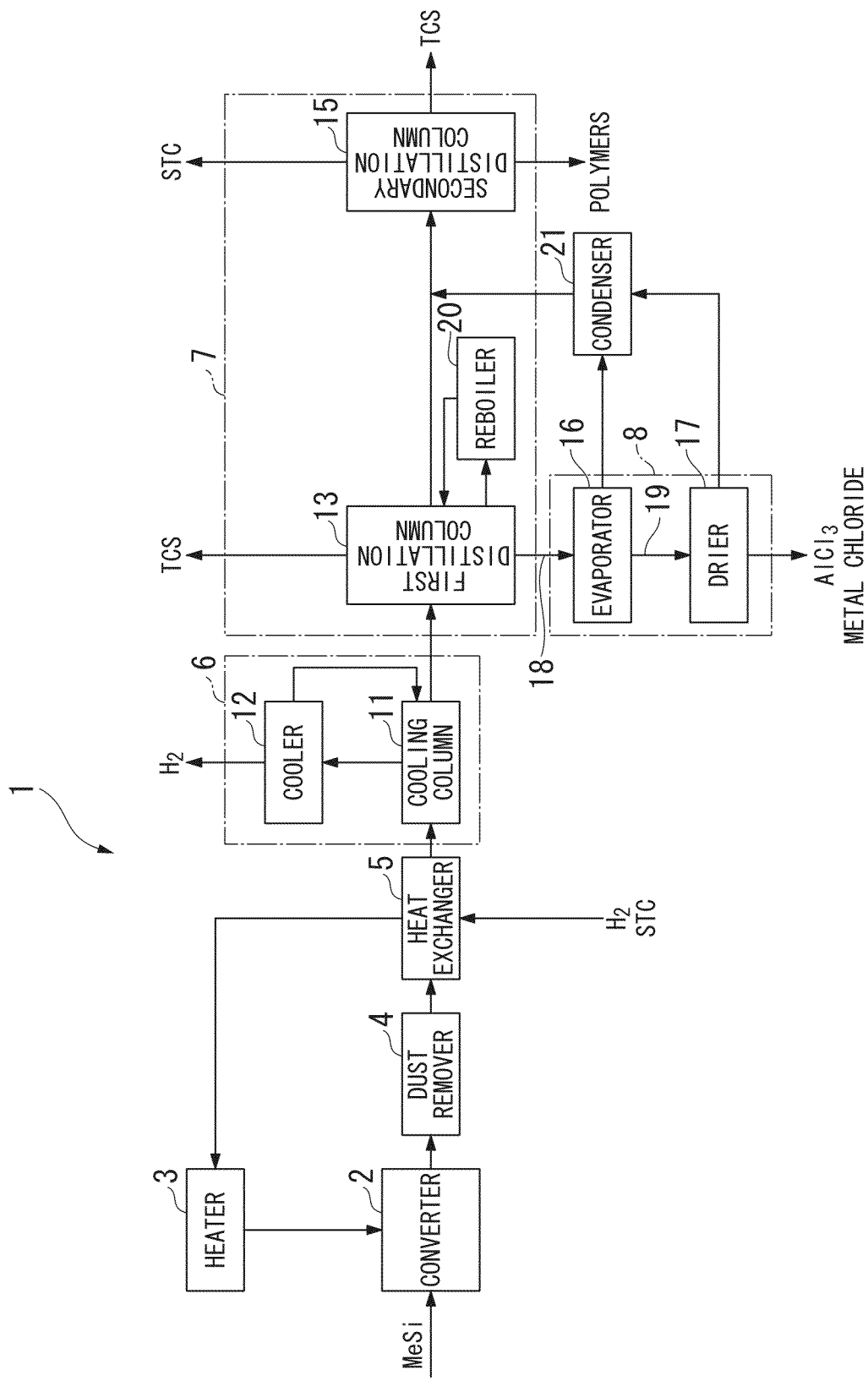

METHOD FOR MANUFACTURING TRICHLOROSILANE

BACKGROUND OF THE INVENTION

1. Field of the Invention

The present invention relates to a method for manufacturing trichlorosilane which is a raw material of polycrystalline silicon.

The present application claims priority on Japanese Patent Application No. 2011-143123, filed on Jun. 28, 2011, the content of which is incorporated herein by reference.

2. Background Art

High-purity polycrystalline silicon used as a semiconductor material is mainly manufactured by the following method (the Siemens process). At first, trichlorosilane ($SiHCl_3$:TCS) and hydrogen ($H_2$) are mixed so as to obtain a mixed gas of the raw materials. The mixed gas is introduced to a reactor so as to be brought in contact with heated silicon rods. Polycrystalline silicon is deposited on the surfaces of the silicon rods by reactions due to hydrogen reduction and thermal decomposition of trichlorosilane at high temperatures.

In this manufacturing of the high-purity polycrystalline silicon, gases exhausted from the reactor contain unreacted trichlorosilane, unreacted hydrogen, silicon tetrachloride ($SiCl_4$:STC), hydrogen chloride, and the like as a byproduct. Therefore, the exhausted gases after the reaction are cooled so as to obtain a non-condensed component including hydrogen and a condensate including silanes. Then, hydrogen is recovered from the non-condensed components, and the condensate is distilled so as to recover trichlorosilane and silicon tetrachloride.

Subsequently, silicon tetrachloride obtained through the distillation is used to react with metallurgical grade silicon and hydrogen, and the reaction gas is cooled so as to obtain a condensate. The obtained condensate is distilled and refined so as to obtain trichlorosilane. Trichlorosilane obtained through this process is reused as a raw material for polycrystalline silicon deposition.

In Japanese Unexamined Patent Application, First Publication No. H10-29813, a technique is disclosed in which silicon particles (metallurgical grade silicon), silicon tetrachloride, and hydrogen are reacted with each other in a fluidized bed at high temperatures in the presence of a catalyst containing copper silicide so as to convert silicon tetrachloride into trichlorosilane.

In addition, in the gas produced by this conversion reaction, unreacted silicon tetrachloride and unreacted hydrogen are contained together with the produced trichlorosilane. Powder of metallurgical grade silicon used as the raw material, and metal chlorides produced through reactions with other impurities (Fe, Al, Ti, Ni, and the like) contained in metallurgical grade silicon are also contained in the gas. Among the metal chlorides, aluminum chloride ($AlCl_3$) has a relatively low sublimation point; and therefore, aluminum chloride becomes a cause of clogging or corrosion of pipes. Therefore, aluminum chloride and the like are extracted and exhausted from a column bottom of a distillation column when trichlorosilane is recovered from a conversion reaction gas. In addition, in order to prevent clogging of pipes between a converter to the distillation column, the concentration of aluminum contained in metallurgical grade silicon of the raw material is controlled to be lower than a predetermined amount (refer to Japanese Unexamined Patent Application, First Publication No. 2006-1804).

In the method for manufacturing trichlorosilane using metallurgical grade silicon as the raw material according to the conventional art, as disclosed in Japanese Unexamined Patent Application, First Publication No. 2006-1804, the concentration of aluminum in metallurgical grade silicon needs to be strictly controlled. However, there is a problem in that reducing of impurities in metallurgical grade silicon causes an increase in manufacturing costs of the raw material and a restriction of varieties of the raw material.

The present invention is designed to solve the above-mentioned problems. An object of the present invention is to provide a method for manufacturing trichlorosilane which is capable of efficiently removing aluminum chloride without being restricted by the concentration of impurities in the raw material of metallurgical grade silicon and without causing clogging of pipes and the like.

SUMMARY OF THE INVENTION

A method for manufacturing trichlorosilane according to an aspect of the present invention includes: reacting metallurgical grade silicon with silicon tetrachloride and hydrogen so as to obtain a reaction gas; condensing the reaction gas so as to obtain a condensate; and distilling the condensate using a distillation system including a first distillation column and a secondary distillation column so as to refine trichlorosilane. The condensate is maintained in a high temperature state so that a concentration of aluminum chloride in the condensate becomes in a range of a saturation solubility or less. The condensate flows to the first distillation column while maintaining the high temperature state. A liquid distilled in the first distillation column is distilled by the secondary distillation column so as to refine trichlorosilane, and a liquid in which aluminum chloride is concentrated is extracted from a bottom portion of the first distillation column. The extracted liquid is concentrated and dried, and then a solid content including aluminum chloride is exhausted.

When the reaction gas is cooled to obtain the condensate, there is a concern that aluminum chloride contained in the reaction gas may be precipitated. However, the concentration of aluminum chloride in the condensate is, for example, in a range of 2 mass % or less which is low. Therefore, by maintaining the condensate in the high temperature state so that the concentration of aluminum chloride becomes in a range of the saturation solubility or less, aluminum chloride can be dissolved in the condensate at the high temperature. Therefore, the condensate is maintained in the high temperature state so that the concentration of aluminum chloride becomes in a range of the saturation solubility or less; and thereby, aluminum chloride is dissolved therein. The condensate flows to the first distillation column in a state where aluminum chloride is dissolved therein. Accordingly, the occurrence of clogging of pipes and the like is prevented. Then, aluminum chloride is separated from the liquid extracted from the first distillation column, and aluminum chloride is concentrated and dried, and thereafter, exhausted.

In the method for manufacturing trichlorosilane according to the aspect of the present invention, when the extracted liquid is concentrated and dried, the extracted liquid may flow down below from the first distillation column so as to be supplied to a concentrator, and a concentrate may be transferred downward from a lower side of the concentrator so as to be supplied to a drier.

The liquid extracted from the bottom portion of the first distillation column contains aluminum chloride. Since the concentration of aluminum chloride is increased in the liquid, aluminum chloride is more likely to be precipitated. Therefore, each of the extracted liquid from the first distillation column and the concentrate in the concentrator is transferred so as to flow and drop downward; and thereby, clogging of pipes connecting the distillation columns, the concentrator, and the drier is less likely to occur.

In the method for manufacturing trichlorosilane according to the aspect of the present invention, a reboiler of the first distillation column may be driven so that an amount of circulated liquid becomes in a range of 20% or more of an amount of introduced liquid.

In the reboiler, the liquid extracted from the first distillation column is heated and returned to the first distillation column; and thereby, the liquid is circulated between the reboiler and the first distillation column. Here, since a part of the liquid is evaporated and gasified due to the heating, there is a concern that the remaining liquid may be concentrated in the reboiler to precipitate aluminum chloride. Therefore, by maintaining the amount of circulated liquid to be in a range of 20% or more of the amount of introduced liquid, precipitation of aluminum chloride is suppressed; and thereby, the liquid can be circulated in a state where the aluminum chloride is dissolved.

In the method for manufacturing trichlorosilane according to the aspect of the present invention, the reaction gas is changed into the condensate at the high temperature, and the condensate is maintained at the high temperature; and thereby, aluminum chloride is in the state of being dissolved in the condensate at the high temperature. Since the condensate in a state where aluminum chloride is dissolved flows to the first distillation column, the occurrence of clogging of pipes and the like is prevented. In addition, since there is no limitation on the impurity concentrations and varieties of the raw material, inexpensive metallurgical grade silicon can be used, and furthermore, a stable operation can be achieved.

BRIEF DESCRIPTION OF THE DRAWINGS

FIG. 1 is a schematic diagram illustrating the entirety of an apparatus for conducting a method for manufacturing trichlorosilane of according to an embodiment of the present invention.

PREFERRED EMBODIMENTS

Hereinafter, embodiments of a method for manufacturing trichlorosilane of the present invention will be described.

FIG. 1 illustrates a schematic configuration of an apparatus for manufacturing trichlorosilane. In the figure, metallurgical grade silicon is denoted by MeSi, trichlorosilane is denoted by TCS, silicon tetrachloride is denoted by STC, and hydrogen is denoted by $H_2$.

The apparatus 1 for manufacturing trichlorosilane includes a converter 2, a heater 3, a dust remover 4 such as a cyclone or the like, a heat exchanger 5, a condensation system 6, a distillation system 7, and a residue processing system 8. In the converter 2, silicon tetrachloride reacts with metallurgical grade silicon and hydrogen so as to produce chlorosilanes including trichlorosilane. The heater 3 heats a mixed gas of silicon tetrachloride and hydrogen and supplies the mixed gas to the converter 2. In the dust remover 4, solid contents such as powder of metallurgical grade silicon and the like are removed from the reaction gas discharged from the converter 2. In the heat exchanger 5, the reaction gas passing through the dust remover 4 exchanges heat with the mixed gas containing silicon tetrachloride and hydrogen before being supplied to the heater 3. In the condensation system 6, the reaction gas after the heat exchange is cooled so as to be separated into a gas containing hydrogen and a condensate. In the distillation system 7, the condensate is distilled so as to be refined into trichlorosilane and silicon tetrachloride. In the residue processing system 8, a liquid extracted from the bottom portion of the distillation column and containing aluminum chloride is concentrated and dried. Then, solid contents are exhausted.

Metallurgical grade silicon supplied to the converter 2 has a granular form, and the converter 2 causes metallurgical grade silicon, hydrogen, and silicon tetrachloride to be brought in contact and react with each other in a fluidized state. The reaction in the converter 2 is an endothermic reaction, and hydrogen and silicon tetrachloride are supplied in a state of being heated to a reaction temperature by the heater 3 in advance.

The condensation system 6 includes a cooling column 11 and a cooler 12. In the cooling column 11, the reaction gas is cooled while being gas-liquid contacted with a silicon tetrachloride liquid. In the cooler 12, the gas discharged from the cooling column 11 is further cooled. Hydrogen passing through the cooler 12 is used as a part of the raw material gas. The condensate produced by the cooling is circulated through the cooling column 11 so as to be used for contacting with the reaction gas. In this case, the condensation system 6 is held at a high pressure, and steam heat tracing tubes laid along steam pipes are used as pipes. Thereby, the circulated condensate is maintained at a temperature described later.

The distillation system 7 includes a first distillation column 13 and a secondary distillation column 15. In the first distillation column 13, a liquid is extracted from the bottom portion of the column, and the liquid contains chlorides such as aluminum chloride and the like excluded from the condensate supplied from the condensation system 6. In addition, trichlorosilane and silicon tetrachloride are distilled. In the secondary distillation column 15, a liquid passing through the first distillation column 13 is distilled.

In addition, the residue processing system 8 is connected to the first distillation column 13. In the residue processing system 8, an evaporator 16 and a drier 17 are included. In the evaporator 16, the liquid containing aluminum chloride and remaining in the bottom portion of the column is extracted and boiled down. Thereby, chlorosilanes are evaporated. A concentrate is collected in the bottom portion by the evaporation of chlorosilanes in the evaporator 16. In the drier 17, the concentrate is dried. In this case, the first distillation column 13, the evaporator 16, and the drier 17 are disposed and aligned in a vertical direction, and the first distillation column 13, the evaporator 16, and the drier 17 are connected through vertical pipes 18 and 19. A condenser 21 is connected to the evaporator 16 and the drier 17, and the condenser 21 liquefies the produced vapor of chlorosilanes and sends the liquefied vapor to the secondary distillation column 15.

Next, the method for manufacturing trichlorosilane by the apparatus 1 for manufacturing trichlorosilane will be described, the method being divided into a conversion reaction process, a subsequent chlorosilane refining process, and a residue processing process. Here, residues include the extracted liquid that is produced in the chlorosilane refining process and is extracted from the bottom portion of the distillation column.

⟨Conversion Reaction Process⟩

Metallurgical grade silicon, silicon tetrachloride, and hydrogen are used as raw materials. Metallurgical grade silicon is silicon in a granular form obtained by refining silica ($SiO_2$) so as to have a purity of about 98%.

Particularly, a mixed gas containing silicon tetrachloride and hydrogen is heated before being supplied to the converter 2. At first, the mixed gas exchanges heat with the reaction gas discharged from the converter 2 by the heat exchanger 5. Thereafter, the mixed gas is heated to a temperature of, for example, 580° C. or higher by the heater 3, and then the heated mixed gas is supplied to the converter 2.

On the other hand, metallurgical grade silicon is continuously supplied to the converter 2, and a fluidized state is formed by the heated mixed gas. The mixed gas reacts with metallurgical grade silicon; and thereby, a reaction gas containing trichlorosilane is produced. In this case, a copper-based catalyst such as copper chloride (CuCl) or the like is used as a reaction catalyst.

⟨Chlorosilane Refining Process⟩

As described above, in the conversion reaction gas produced in the conversion reaction process, unreacted silicon tetrachloride and unreacted hydrogen are included together with trichlorosilane. In addition, the conversion reaction gas further includes fine powder of metallurgical grade silicon, metal chlorides which are produced through reactions with impurities (Fe, Al, Ti, Ni, and the like) in metallurgical grade silicon, compounds having high boiling points, and the like.

In the dust remover 4, dusts such as powder of metallurgical grade silicon and the like are removed from the gas after the conversion reaction. The conversion reaction gas passes through the above-described heat exchanger 5, and then the conversion reaction gas is sent to the condensation system 6. In the condensation system 6, the conversion reaction gas is gas-liquid contacted with silicon tetrachloride in the cooling column 11, and then the conversion reaction gas is cooled by the cooler 12. Thereby, the conversion reaction gas is separated into a gas containing hydrogen and a condensate containing silicon tetrachloride and trichlorosilane. The gas containing hydrogen is recovered, and the condensate is returned to the cooling column 11.

Here, the interiors of the cooling column 11, the cooler 12, and the pipes therebetween are maintained at high temperatures. The condensate is maintained at 75° C. or higher in the cooling column 11, and the condensate in the cooler 12 is maintained at 40° C. or higher.

Next, the condensate is sent to the subsequent distillation system 7 from the cooling column 11 in a state where the temperature is maintained at 75° C. or higher. In the distillation system 7, at first, trichlorosilane and silicon tetrachloride are distilled by the first distillation column 13. In addition, in a reboiler 20 provided in the first distillation column 13, the liquid extracted from the first distillation column 13 is heated, and the heated liquid is returned to the first distillation column 13. Thereby, the liquid is circulated between the reboiler 20 and the first distillation column 13. Here, the amount of the circulated liquid is set to be in a range of 20% or more of an amount of a liquid introduced to the reboiler 20.

Then, the liquid distilled by the first distillation column 13 is sent to the secondary distillation column 15. The liquid is distilled by the secondary distillation column 15; and thereby, trichlorosilane and silicon tetrachloride are recovered. The silicon tetrachloride is used as a part of the raw material, and the trichlorosilane is supplied for manufacturing polycrystalline silicon.

⟨Distillation Residue Processing Process⟩

The liquid extracted from the bottom portion of the first distillation column 13 in the distillation system 7 is extracted via the vertical pipe 18, and the liquid is sent to the evaporator 16. In the evaporator 16, a slurry of the residue is boiled down; and thereby, chlorosilane is evaporated. The chlorosilane vapor is liquefied by the condenser 21, and the liquefied chlorosilane is supplied to the secondary distillation column 15 together with the distillated liquid of the first distillation column 13 so as to be distilled. On the other hand, the slurry liquid containing solid contents such as aluminum chloride and the like is concentrated and collected in the bottom portion of the evaporator 16. When a predetermined amount of the concentrate is collected, the concentrate is sent to the drier 17 via the vertical pipe 19 therebelow, and the concentrate is dried in the drier 17. The solid contents produced by the drying are scraped out by a scraping apparatus such as a screw feeder or the like, and then the solid contents are exhausted. In addition, a chlorosilane vapor is produced even in the drier 17, and the chlorosilane vapor is also liquefied in the condenser 21 together with the chlorosilane vapor from the evaporator 16. Thereafter, the liquefied chlorosilane is supplied to the secondary distillation column 15 together with the distilled liquid of the first distillation column 13 so as to be distilled.

Here, the residues of the secondary distillation column 15 mainly contain polymers. The residues are exhausted, and then are subjected to processes such as decomposition and the like.

As described above, in the method for manufacturing trichlorosilane, the reaction gas containing aluminum chloride produced in the converter 2 is sent to the condensation system 6 in a gas state at high temperatures. The temperature of the reaction gas is about 300° C. even though the temperature thereof is lowered in the heat exchanger 5, and aluminum chloride is maintained in a sublimated state. Therefore, aluminum chloride is not precipitated in the pipes from the converter 2 to the condensation system 6.

In addition, in the condensation system 6, the condensate in the cooling column 11 is maintained at 75° C. or higher, and the condensate in the cooler 12 is maintained at 40° C. or higher. The saturation solubility of aluminum chloride at 75° C. is 2.0 mass %, and the saturation solubility of aluminum chloride at 40° C. is 0.5 mass %. In contrast, the concentration of aluminum chloride in the condensate has a sufficiently lower value (0.007 mass % in the cooling column 11 and 0.005 mass % in the cooler 12). Therefore, aluminum chloride is maintained in a state of being dissolved in the condensate.

Next, the condensate is sent from the cooling column 11 to the first distillation column 13 of the distillation system 7 in the state where aluminum chloride is dissolved. The inside of the first distillation column 13 is maintained at a high temperature, and the concentration of aluminum chloride is low because a large amount of the liquid is present at or in the vicinity of the inlet port of the reboiler 20. However, the liquid is concentrated at or in the vicinity of the outlet due to the evaporation, and the concentration of aluminum chloride is increased. As a result, there is a concern about precipitation of aluminum chloride. As described above, in the reboiler 20, an amount of 20% or more of the amount of the intake liquid (amount of introduced liquid) is controlled to be circulated and not to be evaporated. Thereby, the concentration of aluminum chloride can be maintained at the concentration of the saturation solubility or less even though the liquid is concentrated; and as a result, precipitation of aluminum chloride is suppressed.

The liquid extracted from the bottom portion of the first distillation column 13 is sent to the evaporator 16 via the vertical pipe 18. In the evaporator 16, the concentrate in the slurry form is collected, and then the concentrate is flowed and dropped downward at once in a batch type manner so as to send the concentrate to the drier 17 through the vertical pipe 19. Thereby, clogging of the vertical pipe 19 is prevented.

Finally, the concentrate is dried by the drier 17, and solid contents containing aluminum chloride are scraped out by the screw feeder or the like.

As described above, in the method for manufacturing trichlorosilane, the concentrate of the reaction gas from the converter 2 is maintained in a high temperature state. Thereby, precipitation of aluminum chloride is suppressed, and the concentrate can flow to the first distillation column 13 in a state where the aluminum chloride is dissolved. In addition, the extracted liquid from the first distillation column 13 is concentrated and dried while flowing and dropping downward in the vertical direction. Therefore, it is possible to prevent the liquid from clogging the pipes therebetween. As described above, aluminum chloride is efficiently removed, and clogging of pipes of the entire system can be prevented. Therefore, there is no limitation on the impurity concentrations and varieties of the raw material; and therefore, inexpensive metallurgical grade silicon can be used, and furthermore, the operation can be stabilized.

The present invention is not limited to the above embodiments, and various modifications can be made without departing from the claims of the present invention.

BRIEF DESCRIPTIONS OF THE SYMBOLS

1 apparatus for manufacturing trichlorosilane
2 converter
3 heater
4 dust remover
5 heat exchanger
6 condensation system
7 distillation system
8 residue processing system
11 cooling column
12 cooler
13 first distillation column
15 secondary distillation column
16 evaporator
17 drier
18, 19 vertical pipe
20 reboiler
21 condenser

What is claimed is:

1. A method for manufacturing trichlorosilane, the method comprising:
    reacting metallurgical grade silicon with silicon tetrachloride and hydrogen so as to obtain a reaction gas;
    condensing the reaction gas so as to obtain a condensate; and
    distilling the condensate using a distillation system including a first distillation column and a secondary distillation column so as to refine trichlorosilane,
    wherein the condensate is maintained in a high temperature state so that a concentration of aluminum chloride in the condensate becomes in a range of a saturation solubility or less, and the condensate flows to the first distillation column while maintaining the high temperature state,
    a liquid distilled in the first distillation column is distilled by the secondary distillation column so as to refine trichlorosilane, and a liquid in which aluminum chloride is concentrated is extracted from a bottom portion of the first distillation column, and
    the extracted liquid is concentrated and dried, and then aluminum chloride is exhausted.

2. The method for manufacturing trichlorosilane according to claim 1,
    wherein, when the extracted liquid is concentrated and dried, the extracted liquid flows down from the first distillation column so as to be supplied to a concentrator, and a concentrate is transferred downward from a lower side of the concentrator so as to be supplied to a drier.

3. The method for manufacturing trichlorosilane according to claim 1,
    wherein a reboiler of the first distillation column is driven so that an amount of circulated liquid becomes in a range of 20% or more of an amount of introduced liquid.

4. The method for manufacturing trichlorosilane according to claim 2,
    wherein a reboiler of the first distillation column is driven so that an amount of circulated liquid becomes in a range of 20% or more of an amount of introduced liquid.

* * * * *